United States Patent [19]

Gibson

[11] 3,747,065

[45] July 17, 1973

[54] SYSTEM FOR CORRECTING DETECTED ERRORS IN A HIGH SPEED DIGITAL DATA TRANSMISSION SYSTEM

[75] Inventor: Earl D. Gibson, Huntington Beach, Calif.

[73] Assignee: North American Rockwell Corporation, El Segundo, Calif.

[22] Filed: May 12, 1972

[21] Appl. No.: 252,880

[52] U.S. Cl. .......................... 340/146.1 R, 325/41

[51] Int. Cl. ....................... G06f 11/00, G08c 25/00

[58] Field of Search ........... 340/146.1 BA, 146.1 R, 340/146.1 AB; 325/41, 42

[56] References Cited

UNITED STATES PATENTS

| | | | |
|---|---|---|---|
| 3,386,078 | 5/1968 | Varsos | 340/146.1 R |
| 3,344,353 | 9/1967 | Wilcox | 340/146.1 BA |
| 3,492,578 | 1/1970 | Gerrish et al. | 325/42 |
| 3,524,169 | 8/1970 | McAuliffe et al. | 325/42 |

*Primary Examiner*—Charles E. Atkinson
*Attorney*—L. Lee Humphries, H. Frederick Hamann et al.

[57] ABSTRACT

The error corrector of the present invention operates in conjunction with an error detector which error detector provides outputs indicating that an error has occurred, the polarity of the error and an indication as to whether the error has occurred an even or odd time interval. Specifically, the error corrector, upon being informed that an error has occurred, scans a group of previously estimated residual signals to determine which residual has the largest amplitude and a polarity opposite to the indicated error or polarity. The error corrector then identifies the particular digit estimate associated with the indicated largest residual and either adds or subtracts one level to that estimated digit, depending on the polarity of the indicated error. In most applications, the one correction corrects the detected error.

6 Claims, 8 Drawing Figures

TYPICAL DATA TRANSMISSION SYSTEM USEING THE ERROR CONNECTOR

IDEALIZED TRANSMISSION SYSTEM PULSE RESPONSE FOR PARTIAL RESPONSE SIGNALLING

BLOCK DIAGRAM—
DECISION DEVICE

SCAN START-STOP CONTROL

SYSTEM FOR CORRECTING DETECTED ERRORS IN A HIGH SPEED DIGITAL DATA TRANSMISSION SYSTEM

BACKGROUND OF THE INVENTION

1. Field of the Invention

This invention relates to the field of high-speed transmission systems wherein digital data is transmitted over transmission channels of limited bandwidth. When digital data signals are transmitted through baseband channels at high rates of speed, successive impulses are forced into an overlapping relationship. Various prior art systems have been devised whereby the use of coding at the transmitter and decoding at the receiver makes it feasible to utilize data signals with a large but controlled amount of overlapping. Because of noise and other extraneous stray conditions, errors occur in the detection of the data bits that are received. In nearly all cases, each error can be detected within a short period of time after it occurs. Correction of these erroneously detected signals is the specific field of the present invention.

2. Description of the Prior Art

In one system for utilizing signals that overlap heavily in time, the receiver detects an individual data symbol from the received channel output signal by utilizing analog subtraction of the contributions made by N−1 previous samples of the output signal. In that system, N successive samples are stored at the receiver and an algorithm for the subtraction is devised. The correct interpretation of the given sample depends on the correct interpretation of the N−1 preceding samples. This interdependency of samples causes error propagation, which is the tendency of one error to start a burst of errors. In U. S. Pat. No. 3,492,578, entitled "Multilevel Partial-Response Data Transmission", by Gerrish et al, error propagation is overcome by precoding the input data at the transmitter. The precoder generates a function of the contribution from N−1 successive past input symbols and subtracts this function from the present input symbols. The preceding is such that after passing through the channel each received sample is related to only one message symbol. Simplified, the procedure of precoding and decoding, which is matched to the known channel impulse response, causes the received signals at sampling instants to be independent of samples taken at other sampling instants and this eliminates error propagation in the decoding. The encoding-decoding schemes of that patent do not detect errors that have occurred. Other prior art error detectors, in general, require that extra digits be added to the data stream. In this case, the transmission rate is then higher than the information rate. In many cases, the increased transmission rate causes various degrading effects, offsetting most or all of the advantages of the error detection.

In U. S. Patent Application, Ser. No. 198,871, filed Nov. 15, 1971, entitled "Digit Error Detector", by Earl D. Gibson, the present applicant, there is disclosed a digit error detector which detects errors in a partial response signalling system without the use of redundant digits, which detector not only provides an indication when an error has occurred, but also provides information as to the polarity of the error and whether the error has occurred in an even or odd baud time interval. The present invention utilizes the information from the error detector to automatically correct the detected error without requiring the transmitter to re-transmit that segment of information in which the error has occurred.

SUMMARY OF THE INVENTION

The present error corrector is adapted to be used in a data transmission system utilizing partial response signalling in which the received digits have more possible values than the transmitted digits and wherein the transmitted digits are transmitted at a baud rate which causes the received digit signals to overlap in time. A decision device receives the sampled received signals and, from each sample, provides a digit estimate signal, which signal is proportional to the estimated value of a received digit. The decision device also provides a sampled residual signal in which each sample is equal to the remainder of the received signal sample after the digit estimate.

An error detector receives the estimated digit values. When an estimated digit value reaches a level that is above or below any possible correct value, then, sometime within the next several baud intervals, the error detector provides an output indicating that an error has occurred. The error detector also provides an indication of the polarity of the error along with an indication as to whether the error has occurred in an even or odd baud time interval.

In the error corrector of the present invention, there is provided a means for delaying the residual from the decision device a fixed number of baud intervals. An identify largest residual means receives the delayed residuals and upon command of a scan start-stop control means scans a fixed number of residuals to determine the largest residual having a polarity opposite to the error polarity indication from the error detector. Means responsive to the largest residual signal and the signal indicating the polarity of the error from the error detector operates to add or subtract one level from a digit estimate having the indicated error, which digit estimate was previously delayed a fixed number of bauds so as to arrive at the responsive means at a time corresponding to the added or subtracted one level, so as to provide the corrected digit estimate.

It it, therefore, an object of the present invention to provide an error corrector for use with a high-speed digital data transmission system.

It is a further object of the present invention to provide an error corrector which automatically scans a number of previously received signals to determine which is most likely in error and to apply a correction to that signal before it is used further in the system.

It is still another object of the present invention to provide an error corrector which does not require the use of redundant digits.

These and other objects of the present invention will become more apparent when taken in conjunction with the following description and drawings wherein like characters indicate like parts and which drawings form a part of this invention.

DESCRIPTION OF THE PREFERRED EMBODIMENTS of the invention

Figure 1:
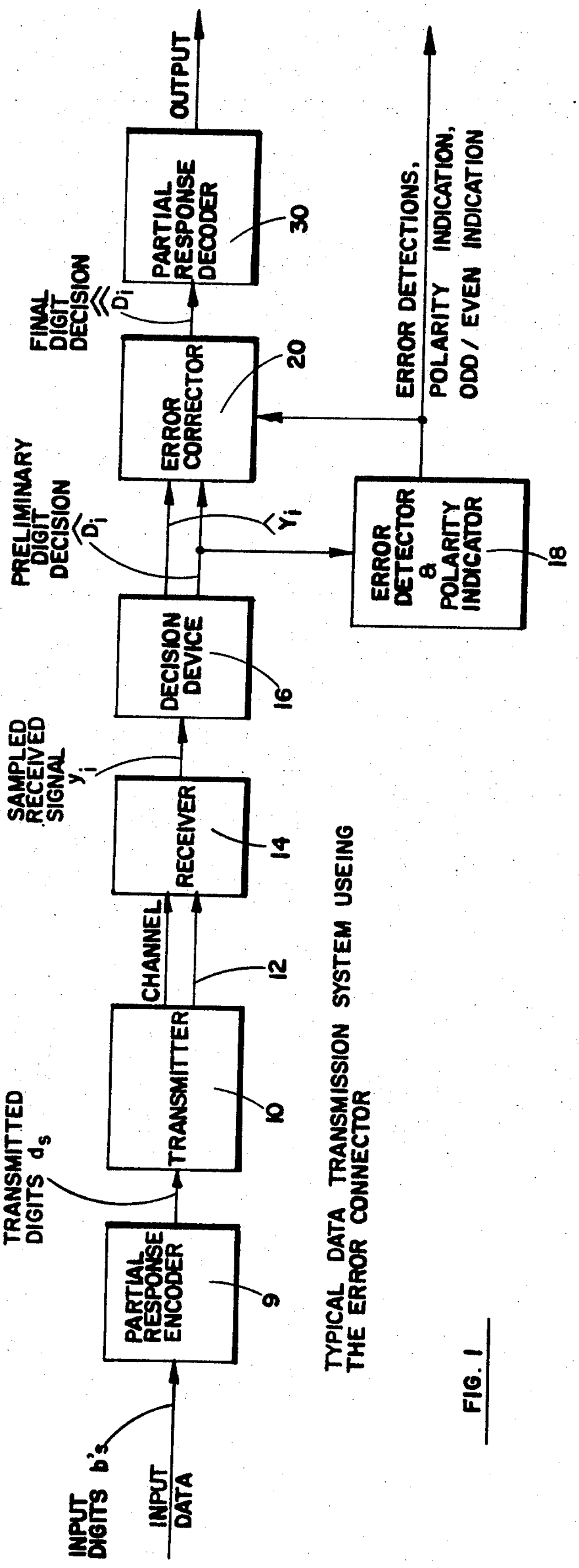
FIG. 1 is a system block diagram illustrating a typical partial response system in which the present error corrector is used.

FIG. 1 illustrates a typical system of OF THE INVENTION type. Input binary digit signals, designated *b*, are fed to a partial response encoder 9 which encoder converts the binary digits into a partial response form for transmission over a transmission channel 12. The prepared partial response digits are designated *d*. An encoder which may be used with the present invention is described as a precoder in U. S. Pat. No. 3,492,578, entitled "Multilevel Partial-Response Data Transmission", by A. M. Gerrish, et al. The *d* digits are fed from the partial response encoder to a transmitter 10 and from there they are transmitted out across the transmission channel 12. The transmission channel 12 is generally a telephone or radio channel. A receiver 14 is connected at the opposite end of the transmission channel. The receiver filters and/or processes the received signal, thereby converting it into a form that enables the decision device to evaluate the received digits from this receiver output signal. The receiver output signal can be either sampled or continuous. If sampled, the sampling rate is generally an integer multiple of the baud rate of transmission. Ordinarily, the decision device utilizes one sample of the receiver output signal per baud time. The amplitude of the signal sample selected for use by the decision device during the $i^{th}$ baud time is herein designated $y_i$. The amplitude of this $i^{th}$ sample $y_i$ is equal to the correct value for representing the $i^{th}$ received digit $D_i$ plus an error component herein called the residual. The signal sample $y_i$ is fed to the decision device 16 which device makes an estimated decision of the digit value, $D_i$, which estimation is designated $\hat{D}_i$, and an estimate of the residual error $Y_i$, which estimation is designated $\hat{Y}_i$. These estimations are made for each signal sample $y_i$. The output from the decision device, $\hat{D}_i$, is then fed to the input of error detector 18 and error corrector 20 with the output $\hat{Y}_i$ being fed to an input of the error corrector 20. The error detector 18 can be the same type described in U. S. Patent Application, Ser. No. 198,871, entitled "Digit Error Detector", invented by Earl D. Gibson, the inventor of the present system. The error detector 18 operates upon the signal $\hat{D}_i$ to provide an output signal indication within a few baud times after an error occurs in the evaluation of a transmitted digit while also providing an output signal indicating the polarity of the detected error. The output signal from the error detector 18 is then fed to the error corrector 20 which responds to the signals from the error detector 18 to scan a set number of previous residual signals to select the largest residual signal having a polarity opposite to that of the indicated error. The error corrector then assumes that the digit associated with the largest estimated residual, with a polarity opposite to the indicated error, is the digit that is in error. The error corrector then operates to change the estimated value of the digit corresponding to that residual by one level in the direction opposite to the error polarity indication obtained from the error detector and polarity indicator 19. In almost all cases, this one change corrects the digit error. The output of the error corrector 20 is then the final digit decision $\hat{\hat{D}}_i$. This digit decision is then fed to a partial response decoder 30 which transforms the $\hat{\hat{D}}$ signals into the output digits, *b*, which digits ideally correspond to the input digits, *b*, fed into the partial response encoder 9. The *b* signals can take a binary form, wherein the marked bits (presence of a pulse) are called ones and the spacing bits (absence of a pulse) are called zeros. The *b* digits may also take the multilevel form, for example, a 4-level signal. Multilevel pulse encoding is used when it is desired to exceed the maximum practical binary data transmission rate over band-limited facilities. The symbol rate, however, still remains limited by the well-known theories of Nyquist; but the effective serial data rate is increased above this limit by converting the high speed binary signals into the multilevel form. The end result is that each symbol represents a plurality of binary data bits. The decoding of these multilevel signals does require additional protection against intersymbol interference which tends to cause errors.

Figure 2:
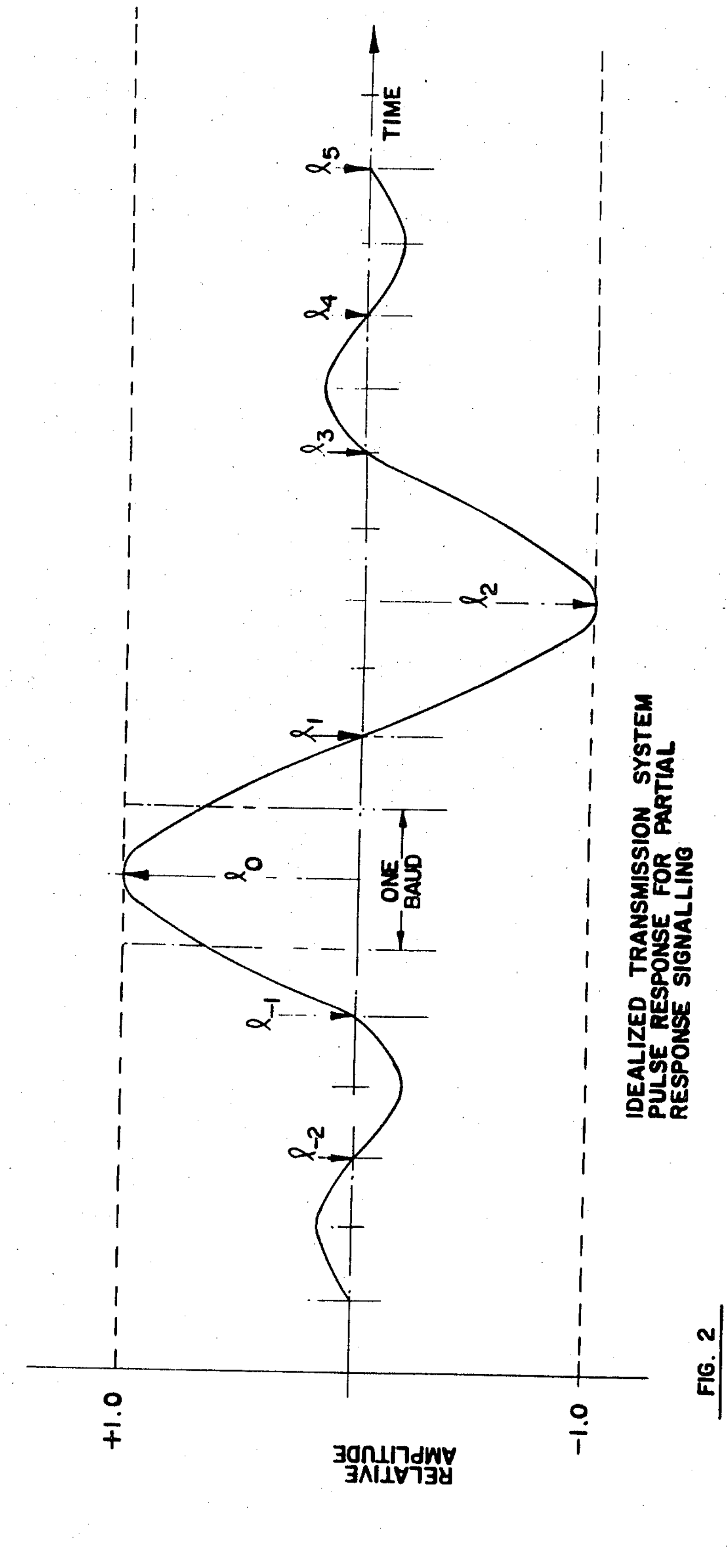
FIG. 2 is a waveform illustrating the idealized transmission system pulse response for use in a particular type of partial response signalling.

An idealized transmission system pulse response for representing one digit in the type of partial response signaling utilized with the present invention is illustrated in FIG. 2. With this type of signaling, the transmitter transmits digits at a baud rate and the receiver samples the received signals at the baud rate. In this particular type of pulse response, there are two major amplitude samples. These are designated $l_0$ and $l_2$. The pulse response shown in FIG. 2 has the one major sample amplitude $l_0$ occurring at a normalized +1 amplitude, with the next sample $L_1$ being at zero and the next major sample amplitude $l_2$ occurring at a normalized −1 amplitude. All other samples are ideally of zero amplitude. As has been previously stated, in partial response transmission systems, the transmitted digits are allowed to overlap in time in order to more efficiently utilize the transmission channel bandwidth. If this were not the case, all of the pulse response samples except one would have to be constrained to a negligible amplitude in order not to interfere with other transmitted digit signals. Because of this overlapping condition, the received digit signal, D, has more possible values than the transmitted digit, *d*.

Mathematically speaking, the $i^{th}$ signal sample at the output of the decision device 16 in FIG. 1, is ideally:

$$D_i = d_i - d_{i-2} \tag{1}$$

where $d_i$ is the amplitude of the $i^{th}$ transmitted pulse and $d_{i-2}$ is the amplitude of the pulse transmitted two baud periods prior. For illustrative purposes, we will first consider the case in which the possible relative amplitudes of the transmitted pulses, the *d's*, *are* ±1 and ±3. Then, each $D_i$ has seven possible amplitudes: 0, ±2, ±4, and ±6. For simpler implemenation, the $D_i$ values can be normalized to 0, ±1, ±2, and ±3

In the non-idealized case, the $i^{th}$ sample of the pulse response at the input of the decision device 16 is:

$$y_i = D_i + Y_i = d_i - d_{i-2} + Y_i \tag{2}$$

where $Y_i$ is an error component called the "residual". The residual exists because of noise, uncontrolled intersymbol interference, jitter in carrier phase, sample timing, etc. The decision device makes a decision estimate $\hat{D}_i$ from each signal sample $y_i$. Now:

$$\hat{D}_i = D_i + E_i \tag{3}$$

where $E_i$ is any error in the $i^{th}$ decision and ∧ denotes "estimated value of". Also, $$y_i = D_i + Y_i = \hat{D}_i + \hat{Y}_i = D_i + E_i + \hat{Y}_i$$

and $$\hat{Y}_i = Y_i - E_i \tag{5}$$

The relationships in Equations (3), (4), and (5) apply to various methods of partial responses; whereas, Equations (1) and (2) apply specifically to the particular method of partial responses which uses the pulse response shown in FIG. 2.

Figure 3:
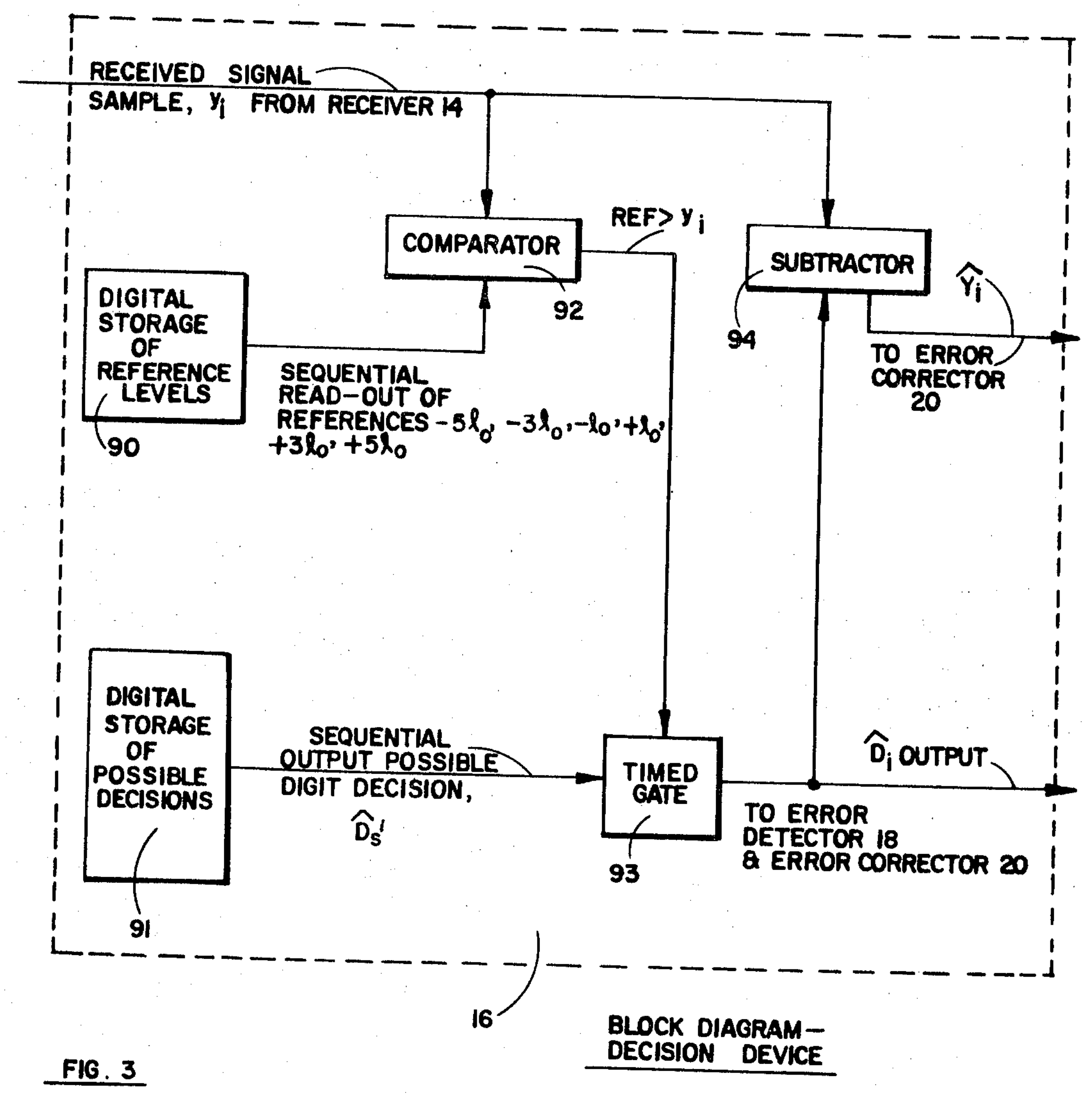
FIG. 3 is a block diagram of a decision device which may be used in the system of FIG. 1.

Refer to FIG. 3 wherein there is shown one type of decision device 16 which may be used with the invention. The decision device can be a fairly conventional type of device that evaluates each received digit from the amplitude of a received signal sample. The value of each received digit is decided by comparing a received signal sample amplitude against reference signal amplitudes. The number of reference signal amplitudes needed depends upon the number of signal amplitudes transmitted, as illustrated by the following table, which applies to partial response signalling:

| Number of Levels Transmitted | Number of Possible Correct Digit Decisions | Number of Reference Levels Used |
|---|---|---|
| 2 | 3 | 2 |
| 3 | 5 | 4 |
| 4 | 7 | 6 |
| 8 | 15 | 14 |

The following table illustrates the relationship between the digit decisions and the reference levels for the case where there are seven possible digit decisions, for example:

| Possible Decisions ↓ | Decision Threshold Levels ↓ |
|---|---|
| 6 | |
| | $5l_0$ |
| 4 | |
| | $3l_0$ |
| 2 | |
| | $l_0$ |
| 0 | |
| | $-l_0$ |
| −2 | |
| | $-3l_0$ |
| −4 | |
| | $-5l_0$ |
| −6 | |

As an operating example, the decision device makes the decision $\hat{D}_i = 4$ when the $i^{th}$ received signal sample amplitude, $y_i$, is between $3L_0$ and $5l_0$, where $l_0$ is a properly selected scale factor.

FIG. 3 illustrates the digital implementation of the decision device 16. During each baud time interval of transmission, the digital numbers $-5\,l_0$, $-3l_0$, $-l_0$, 0, $l_0$, $3l_0$ and $5l_0$, representing the reference signal levels, are read in sequence out of the digital storage of reference levels device 90. Each of these reference levels is compared in amplitude with the received signal sample, $y_i$, by the comparator 92.

The reference levels are read into the comparator in the order of increasing amplitude. When the first reference level that exceeds $y_i$ enters the comparator, the comparator generates an output pulse which indicates that the amplitude of $y_i$ is between this reference level and the adjacent, lower reference level. The timing of this comparator output pulse carries the information for making the digit decision.

Simultaneously, the possible digit-decisions are read sequentially out of the digital storage of possible decisions device 91. The timing of the read-outs is such that, when the comparator generates an output on receiving a given reference level, the digit decision that falls between this reference level and the adjacent, lower reference level is arriving at the input of the timed gate 93. The pulse from the comparator opens the timed gate, which passes the digit decision from device 96 to the output which is connected to an input to subtractor 94 and to error detector 18 and error corrector 20. The timed gate 93 stays open only long enough to pass one digit decision per baud time interval of transmission.

The subtractor 94 subtracts $\hat{D}_i$ from $y_i$ to obtain an estimate, $\hat{Y}_i$, of the error signal $Y_i$. When the digit decision is correct, $\hat{D}_i = D_i$ and $\hat{Y}_i = Y_i = y_i - D_i$. When the digit decision is in error by $E_i$, $\hat{D}_i = D_i + E_i$, $Y_i = y_i - D_i = y_i - \hat{D}_i + E_i$, $\hat{Y} = y_i - \hat{D}_i = y_i - D_i - E_i$ and $\hat{Y}_i + \hat{D}_i = Y_i + D_i = y_i$. The output of subtractor 94 is fed to the error corrector 20.

Figure 4A:
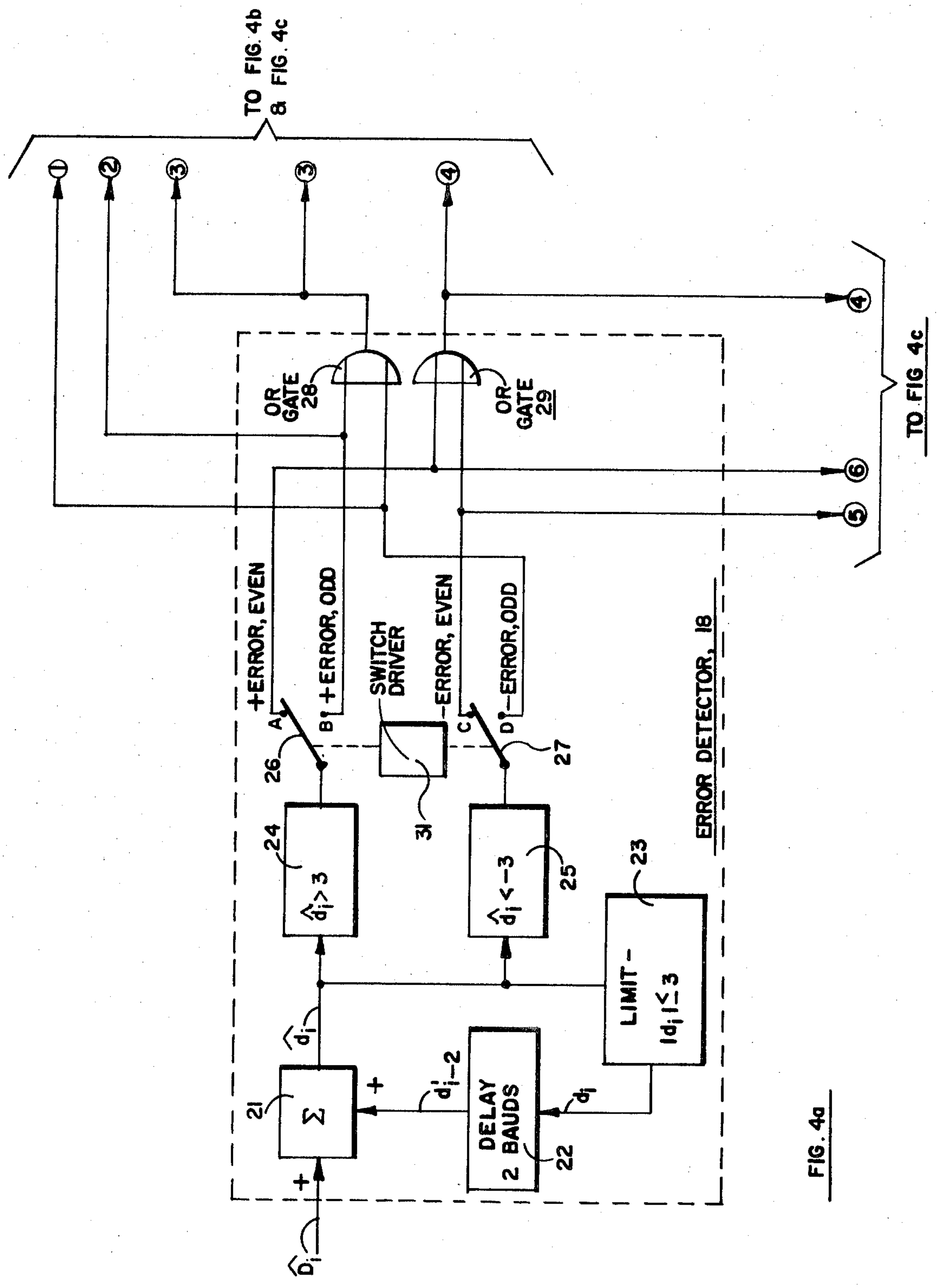
FIG. 4*a*, 4*b*, and 4*c* illustrate in a detailed block diagram form the preferred embodiment of the error corrector and error detector which may be used with the error corrector.
Figure 4B:
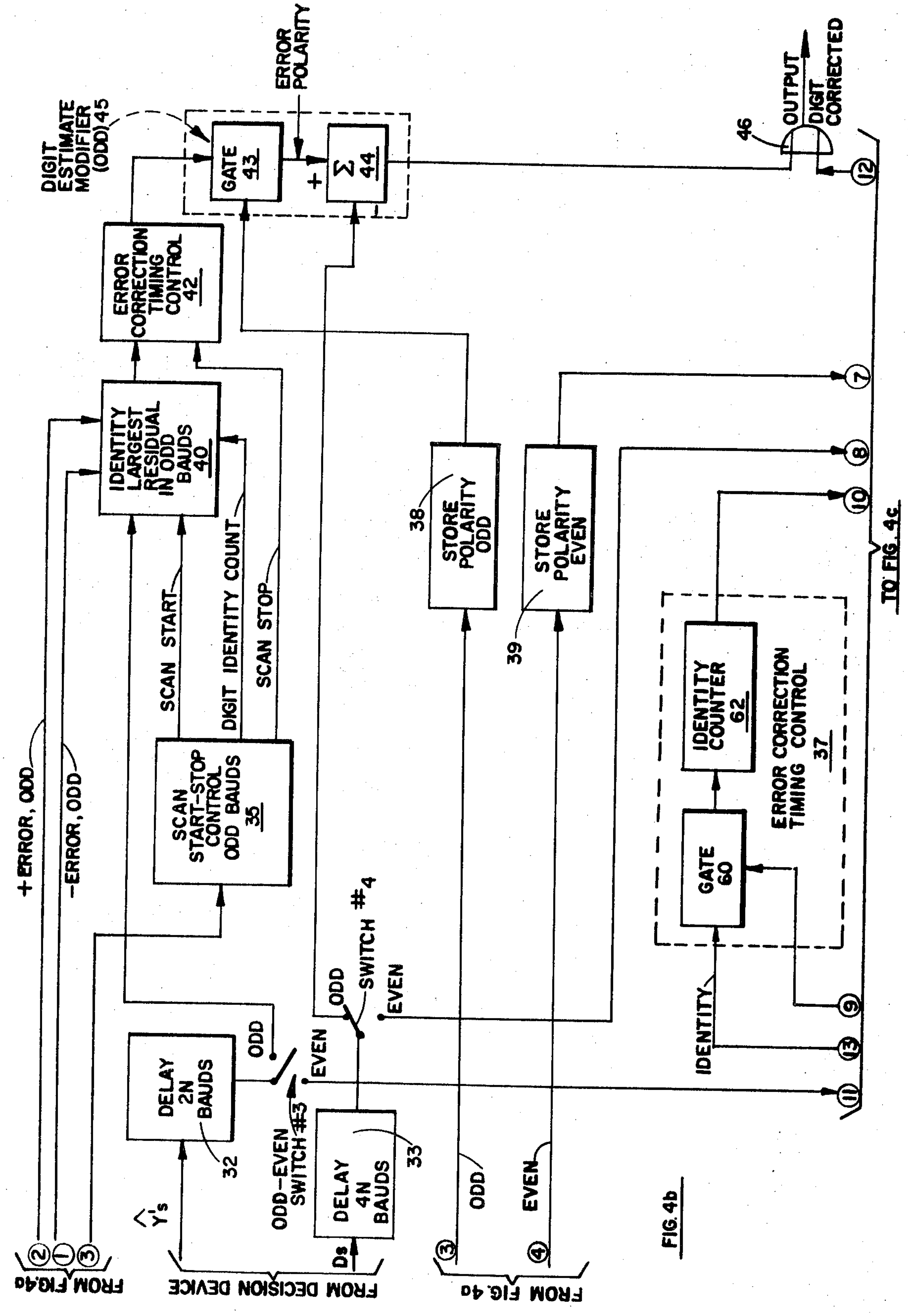
Figure 4C:
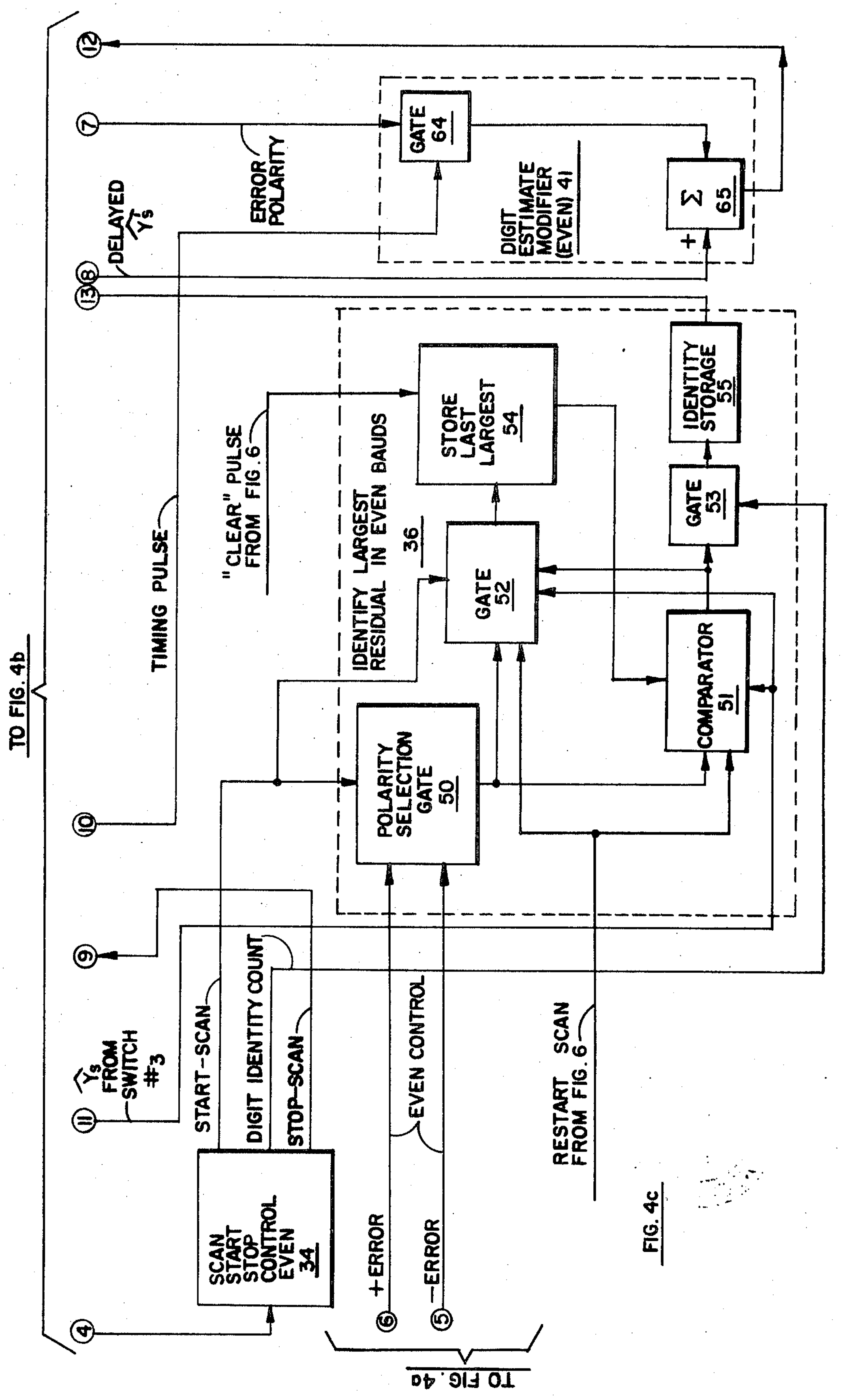

FIG. 4 presents the implementation of the error detector 18 for the particular method of partial responses described above. In this particular embodiment, it is assumed that the received digits from the decision device 16 are of the 7-level digit type. The sequence of digit decisions enter the summation device 21, where each digit decision $\hat{D}_i$ is summed with the detected digit $d'_{i-2}$, which digit occurred two baud time intervals prior to the most recently received signal. The output of the summing device 21 is a digit estimate $\hat{d}_i$. In the absence of error $d'_{i-2} = d_{i-2}$, $\hat{d}_i = d_i$ and, according to equation (1), the output of the summing device is the most recently received digit $d_i$, which in this case is a 4-level digit. When no error has occurred in the digit estimate $\hat{d}_i$, it passes unchanged through a limiting device 23. If digit estimate $\hat{d}_i$ were to have an absolute value greater than 3 which is the maximum possible correct absolute value for this particular 4-level coding used, the signal would automatically be limited in amplitude to be ±3.

The limiting device 23 (or "limit-to $|d_i| \leq 3$" device) in FIG. 4 is a device that performs the following functions:

When $-3 \leq \hat{d}_i \leq +3$ set $d'_i = \hat{d}_i$

When $\hat{d}_i > +3$ set $d'_i = +3$

When $\hat{d}_i < -3$ set $d'_i = -3$ where $d_i$ and $d'_i$ are the input and output of this device respectively. It is straightforward to implement such a device in digital hardware.

The output from the limiting device 23 is then fed to a delay means 22 which, for this particular type of coding, delays the signal $d'_i$ two baud intervals of time to create the signal $d'_{i-2}$, which signal is fed back to the summation device 21.

Whenever a digit error occurs in one of the 7-level input decisions, $\hat{D}_i$, it causes an equal error in the 4-level digit $\hat{d}_i$ at the output of the summation device. This error propagates around the loop, causing the same error in every second subsequent 4-level digit, $\hat{d}_{i+2}$, $\hat{d}_{i+4}$ etc., until the absolute value of some 4-level digit at the output of the summation device exceeds 3. Then, if the error was positive, the threshold device 24 generates a pulse, indicating that a positive error has occurred at some integer multiple of two bauds earlier. When the output of the summation device 25 falls below −3, the threshold device 25 generates a pulse, indicating that a negative error has occurred at some integer multiple of two bauds earlier.

In further explanation, the limit device 23 operates in a way such that when the output from the summation device exceeds +3, the limit device sets its output, $d'_i$ to a +3 value. Similarly, when the output of the summation device drops below −3, the limit device sets its output $d'_i$ to −3. Thus, whenever the absolute digit value of $\hat{d}_i$ exceeds 3, the limit device changes the digit estimate. When this happens, the summation device implements the equation $$\hat{d}_i = \hat{D}_i + d'_{i-2} \qquad 6$$

This, in turn, stops the error propagation around the loop.

Switches 26 and 27 are connected to receive the output of threshold devices 24 and 25, respectively. A switch driving means 31 is connected to the movable arms of switches 26 and 27. The switch driver moves the arms alternately at a rate corresponding to the baud transmission rate. The received baud time intervals are arbitrarily divided into odd and even intervals, the odd-/even designation being synchronized with the receiver baud timing. By means of these switches, the error detector gives error detection signals for even baud intervals on terminals A and C and for odd baud intervals on terminals B and D. Positive error indications appear on switch terminals A and B, whereas negative error indications appear on switch terminals C and D. The switches, 26 and 27, are shown in a mechanical form, but in the actual implementation, these switches are of the electronic type.

In FIG. 4, in all blocks where the number 3 appears, this number applies to the 4, 7-level method of partial response described above, in which four signal levels are transmitted and seven levels are received. This same basic method of partial responses, which will be called "Type 1 Partial Responses", can be used with different numbers of signal levels; and the error detecting device 18 shown in FIG. 4 can be used with any set of numbers of possible signal levels in type 1 partial responses by merely using a different number instead of 3 for each set of possible signaling levels. Table 1 lists the number to use in the error detector 18 for various numbers of signal levels. The signals on terminals A and C are fed to the inputs of OR gate 29. The signals on terminals B and D are fed to the inputs of OR gate 28. A signal appears on the output of OR gate 28 upon the detection of an odd error and on the output of OR gate 29 upon the detection of an even error.

The estimated residuals $\hat{Y}_i$ from the decision device 16 enter a delay means 32 and are delayed for 2N bauds, where the value of N is selected to provide the length of a fixed scan to be described below. In the applicant's operable embodiment, the value chosen was 20. Switch No. 3 operates at the baud rate to connect the output of the baud delay 32 alternately to the ODD and EVEN labeled input lines leading to "identify largest residual in odd bauds" means 40 and to "identify largest residual in even bauds" means 36, respectively.

Next, error correction in the odd numbered digits will be described. The odd and even numbered digits are corrected separately by the same type of circuitry. After each detected digit error in an odd baud, the "identify largest residual in odd bauds" means 40 scans the estimated $Y$'s residuals for those odd digits that have significant probability of being the erroneous digit. Either a fixed or a variable length scan, or both, can be used. In the fixed length scan, N consecutive odd digits are scanned. The last of these digits is the digit in which the error was detected. With N ≥ 20, the probability is high that the detected error occurred in one of these scanned digits. In these scanned digits, the digit that contains the residual with the largest magnitude of a polarity opposite to that of the detected error is selected as the digit most likely to be the erroneous digit.

The scan start-stop control devices 34 and 35 use the $\hat{d}$*'s* and error detections from the error detector 18 to control the time interval over which the residuals, $Y$*'s*, are scanned when an error is detected. The simplest version scans a fixed number of residuals preceding and including each digit in which an error is detected. However, in some cases, additional information, in addition to the error detections, can be derived to reduce the scan length while still scanning all of the digits that could possibly be in error. For example, when a digit error is detected, it is known that this error could not have occurred prior to the last preceding digit with the maximum allowed magnitude and opposite polarity from the detected error. Also, the error is unlikely to have occurred prior to the last previous error detection.

For the particular method of partial responses that uses the pulse response shown in FIG. 2, an ODD-EVEN control is used. This control causes the scan to be confirmed to odd or even digits when an error is detected in an odd or even digit, respectively.

Since the estimated residual, $\hat{Y}_i$, always has the opposite polarity from the digit error $E_i$, the error polarity indications from the decision device 16 are fed to the respective "identify largest residual", means 36 and 40, so that one or the other of these devices need only scan those residuals that have the corresponding polarity that could come from the erroneous digit.

TABLE 1

| Number of signal levels: Transmitted | Number of signal levels: Received | Possible correct values of $d_i$ | Possible correct values of $D_i$ | Type of partial responses | Number to use in the 23, 24 and 25 blocks |
|---|---|---|---|---|---|
| 2 | 3 | ±1 | 0, ±2 | Binary, Type 1 | 1 |
| 3 | 5 | 0, ±2 | 0, ±2, ±4 | Ternary, Type 1 | 2 |
| 4 | 7 | ±1, ±3 | 0, ±2, ±4, ±6 | Quaternary, Type 1 | 3 |
| 8 | 15 | ±1, ±3, ±5, ±7 | 0, ±2, ±4, ±6, ±8, ±10, ±12, ±14 | 8-level, Type 1 | 7 |

The error correction timing controls 42 and 37 generate a control pulse at the time the indicated erroneous digit arrives at the digit estimate modifiers 45 and 41. At this time, this digit estimate is increased or decreased to the next adjacent decision level. The choice between increasing or decreasing is controlled by the error polarity indication from the error detector, which indication has been stored in the store polarity odd means 38 or in the store polarity even means 39.

The FIG. 4 embodiment uses a fixed scan length except when the time interval between two error detections is shorter than the scan length. In this latter case, there is one scan of fixed length preceding the first error detection and a second scan from the first error detection to the second error detection. The estimated residuals, $\hat{Y}$'s, are delayed 2N baud time intervals, where N is the number of even or odd bauds to be scanned in the fixed-length scan, which will be called an N-scan. The delayed Y's enter an alternating odd-even switch No. 3 which separates the odd digits from the even digits by switching at the baud rate. Here duplicate hardware is shown for the odd and even digits so that a scan of the odd $\hat{Y}$'s can proceed concurrently with a scan of the even $\hat{Y}$'s. However, not all of the hardware shown duplicated here needs to actually be duplicated in practice because time sharing of hardware can be used. The even-numbered residual estimates enter a polarity selection gate 50 controlled by the digit error polarity signals from the error detector 18. This gate passes only those estimated residuals, $\hat{Y}$'s, of opposite polarity to the digit error, $E_i$.

Let us first consider the case of the fixed length scan, the N-scan. Here the objective is to scan N even bauds, N ≈20, ending with the baud in which the error detection occurs. When the error detector generates an error detection, the residual that arrived at the decision device 16 2N baud times earlier is arriving at the input of the comparator 51 because of the 2N baud delay of the residuals. Therefore, by starting the scan at the time of the error detection and ending it 2N baud times later, the N residuals that occurred in the N even digits ending with the error detection, will be scanned. An N-scan, therefore, starts at the time of the error detection, but actually starts with the residual that arrived at the decision device 2N baud times earlier than the error detection.

The even $\hat{Y}$'s of the selected polarity enter the comparator 51. The start-scan signal from the scan start-stop control 34 causes the concurrently arriving residual, $\hat{Y}$, to pass through gate 52 into the storage register 54 labeled "store last largest". For the remainder of the scan, the comparator 51 compares each newly arriving even $\hat{Y}$ with the one stored in the "store last largest" device 54. When the newly arriving $\hat{Y}$ is larger (in absolute value) than the $\hat{Y}$ in the "Store last largest" device, the comparator 51 opens gate 52 and the newly arriving $\hat{Y}$ replaces the $\hat{Y}$ previously stored in the "store last largest" device. This latter device thus always keeps in storage the last largest $\hat{Y}$ of those admitted by the odd-/even switch No. 3 and the polarity selection gate 50.

Each time the comparator 51 opens gate 52, it also opens gate 53. Then, a digit identity count from a counter in the start-stop control equipment 34 passes through gate 53 into the Identify Storage means 55. This count identifies the digit associated with the residual concurrently being transferred into the "store last largest" device; and each new count transferred to identify storage 55 replaces the count previously stored there. Therefore, at the end of the scan, the count stored in Identity Storage 55 identifies the digit associated with the largest residual of the selected polarity. This digit is selected as the one most likely to contain the digit error.

The scan start-stop control 34 generates a stop-scan pulse 2N baud times after the error detection, which is the time the Y associated with the error detection enters the comparator. This stop-scan pulse opens gate 60, which transfers the erroneous digit identity from identity storage 55 to identity counter 62, which starts counting at the baud rate until the count reaches the number stored in identity storage 55. At this time, the digit most likely to contain the error is arriving at the output of the 4N baud delay 33. Therefore, at this time, the identity counter opens gate 64. Meanwhile, the device 39, labeled "store polarity even", which can consist of a flip-flop, has stored the digit error polarity as determined by the error detector. Gate 64 passes the polarity of the digit error to the summation device 65. Since the possible correct values of the digits, D's, are 0, ±1, ±2, ±3 (normalized units), the summation device 65 subtracts E from the estimated digit, D, where E is a unit of the same polarity as the digit error. In a large percentage of the cases, this subtraction corrects the digit error.

The circuitry labeled "Identify Largest Residual Odd Bauds" 40, "Error Correction Timing Control" 42, "Digit Estimate Modifier" 45, the "scan start-stop control odd bauds" 35 and the "store polarity odd" 38 are identical in construction and operation to the previously described components for even bauds.

Figure 5:
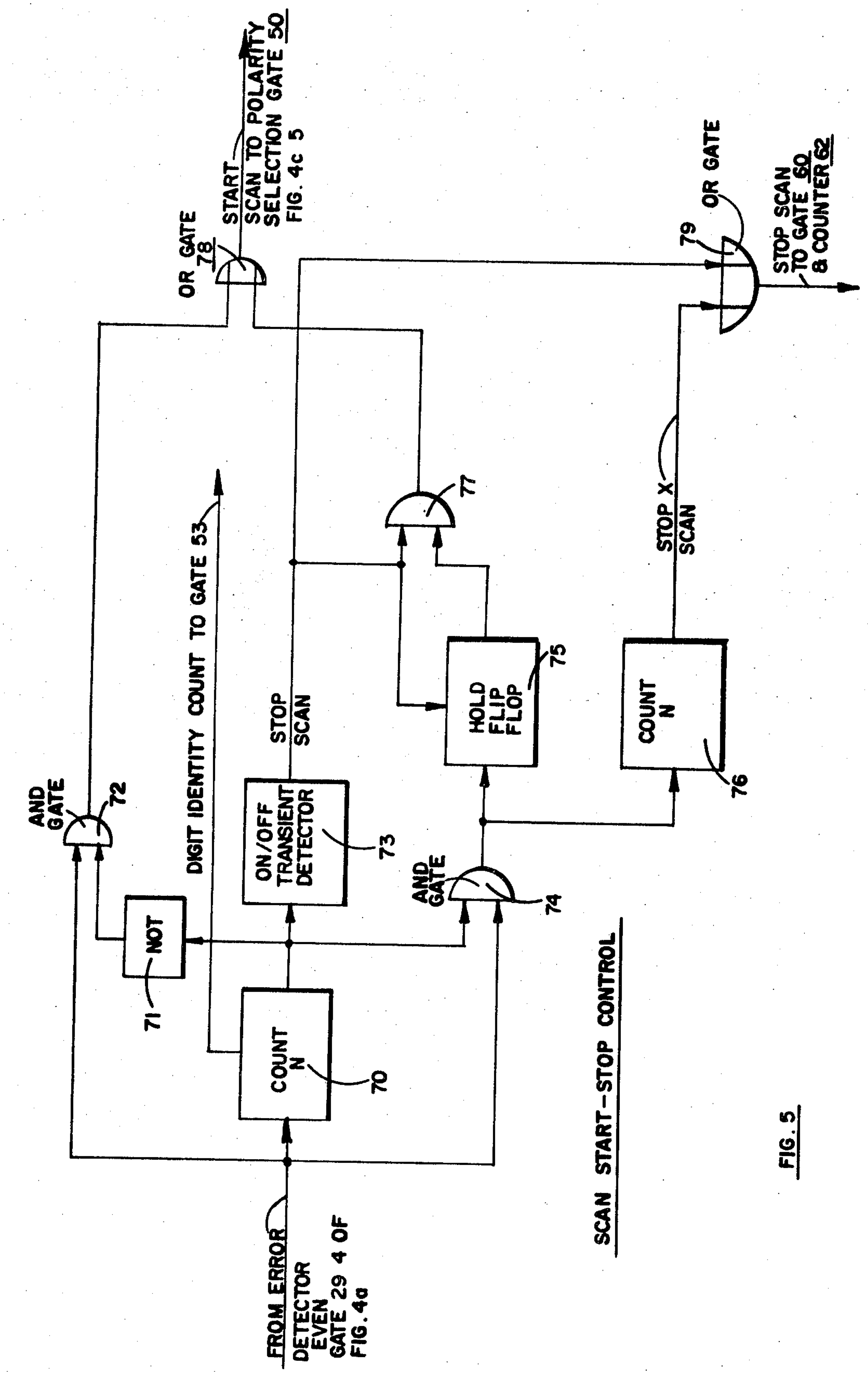
FIG. 5 illustrates in block diagram form a scan start-stop control which is used as one of the blocks in FIG. 4.

Refer to FIG. 5 wherein is shown the scan start-stop control even 34. In addition to controlling the timing of the scan start and stop, this equipment generates the digit identity count that is transferred to gate 53 of FIG. 4. Each even error detection signal from the error detector starts the N counter 70. This counter counts for N even (or N odd) bauds. While it is counting, it applies an output to the NOT circuit 71, the on/off transient detector 73 and AND gate 74. Suppose two error detections occur in the even bauds less than N even bauds apart. When the first error detection pulse arrives, the count N device 70 will not yet have generated an output, so the NOT circuit 71 will apply a pulse to AND gate 72. Then, an N-scan start signal will immediately be generated through AND gate 72 and OR gate 78. N baud times later, the count N device 70 stops generating an output and the on/off transient detector 73 generates a stop-scan pulse that is passed through OR gate 79 to the output. Thus, scan timing signals are generated at the time of the first error detection and N even digits later. Because the residuals are delayed by 2N baud times (N even baud times), the residuals scanned will be the N even residuals ending with the residual associated with the error detection.

Suppose a second error detection occurs within less than N even bauds after the first error detection. Then we desire the next scan to involve only those even digits that lie between the two error detections, including the digit of the second error detection but not the digit of the first error detection. When the second error detection, which follows the first error detection by less than N even baud times, arrives at the count N device 70, this device is still generating an output as a result of the first error detection. This output is applied to the NOT gate 71 and this prevents the AND gate 72 from passing the second error detection pulse. This prevents the second scan from starting too soon. We want the second scan to start immediately following the end of the first scan. At the end of the first scan, the stop-scan signal from the "on-off transient detector" 73 is applied to AND gate 77. Meanwhile, the second error detection plus the output from the count N device have operated AND gate 74, thereby setting the hold flip-flop 75 to the "on" state. This flip-flop remains "ON" until the stop-scan signal for the first scan is received, at which time this FF is reset and AND gate 77 is opened to start the second scan, the start-scan pulse being fed out through OR gate 78.

The stop-scan signal is always generated N bauds after the error is detected, which causes the error correction timing control 37 to scan the digits up to and including the digit in which the error is detected. This embodiment of the error correction timing control scans the N even (or odd) digits ending with the error detection except when there was a previous error detection less than N even (or odd) bauds back. In this latter case, the error correction scan is from the end of the previous scan up to and including the digit in which the error is detected.

The systems of FIGS. 4 and 5 for starting the scan have a limitation in that they fail to take advantage of some information that can sometimes be used to reduce the needed scan length, thereby substantially reducing the probability of correcting the wrong digit. The following applies to either the stream of even digits or the stream of odd digits.

Suppose, for example, the error detector shows that the error was positive. Then, we know that the error could not have occurred in a digit, D, for which the associated d has an estimated value −3 because a digit with the most negative possible value cannot contain a positive error. Furthermore, since the positive error would propagate in every second digit, $\hat{d}$, until the digit in which the error is detected, we know that the error in the $\hat{D}$ could not have preceded the last digit $\hat{d}$ with value −3 preceding the error detection. The error in the $\hat{D}$ must lie between the error detection and the last −3 that preceded the error detection (considering only the odd or the even bauds). The error could not be in this last digit, $\hat{D}$, for which the associated d had the value −3, but could be in the digit $\hat{D}$ where the error is detected.

Figure 6:
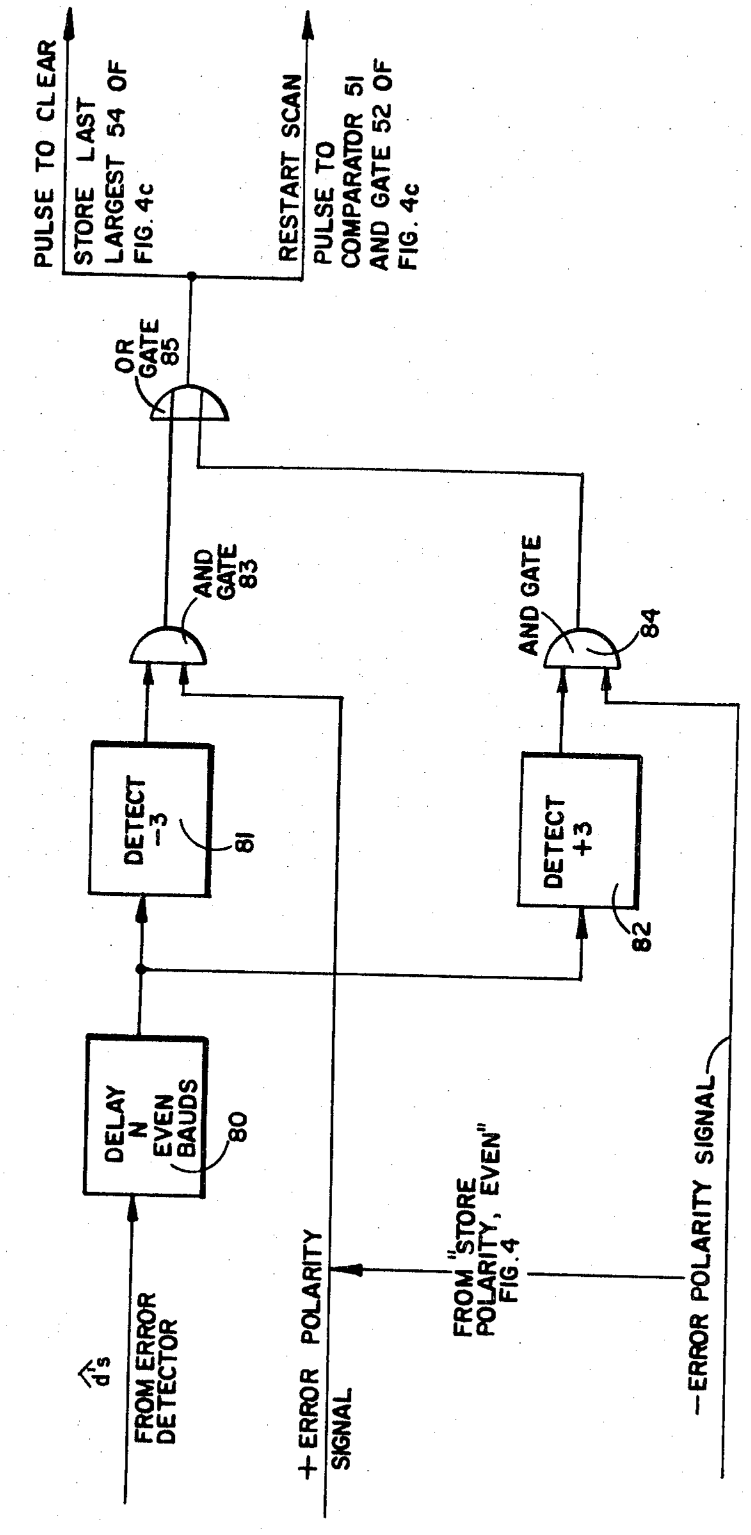
FIG. 6 illustrates in block diagram form additional circuitry for improving the scan-start control functions shown in FIG. 5.

In FIG. 6 there is shown an additional circuit that can be added to the scan start-stop control 34 (FIG. 5) to delay the scan start until after the last $\hat{d}$ with value −3 whenever any such $\hat{d}$ occurs. Actually, the scan is started as before, but when any $\hat{d}=-3$ occurs, the scan is restarted and the previous part of the scan is eliminated. Whenever an error is detected, the scan is started. As in FIG. 5, FIG. 6 shows the circuitry for the even digits only. The same circuitry is duplicated for the odd digits. The $\hat{d}$'s from the error detector pass through the N even baud delay 80 to enter the detect −3 circuit 81 and the detect +3 circuit 82. Note that when the error detection occurs, the $\hat{d}$ that arrived at the receiver N even baud times prior to the error detection is arriving at the output of the N even baud delay 80. Whenever a $\hat{d}=-3$ arrives, the detect −3 sends a pulse to AND Gate 83. If the detected error was positive, a signal from "store polarity-even" 39, FIG. 4 will be applied to AND gate 83. Then, when the $\hat{d}=-3$ arrives, AND gate 83 will generate an output pulse. This pulse goes to the "store last largest" means 54 in FIG. 4 to clear that device after it passes thru OR gate 85. This pulse also goes to the comparator 51 and gate 52 to restart the scan in the same manner that the scan was initially started. A little delay is introduced into the restarting so that the digit with the estimated value of −3 is not included in the restarted scan. Restart of the scan does not means that the count in count N means 70 (FIG. 5) is restarted. This count is continued from the time the scan is restarted until the count reaches N. This count is utilized for identifying the erroneous digit and for stopping the scan. However, when the scan is restarted, the "store last largest" register 54 is cleared and all preceding $\hat{Y}$'s are ignored in order to effectively shorten the interval of search.

Similarly, when the detected error is negative, each $\hat{d}_i=+3$ signal pulse passes through the "detect +3", AND gate 84 and OR gate 85 to clear the "store last largest" device and restart the scan. The scan stop is the same as before.

While it has been shown what are considered to be the preferred embodiments of the invention, it would be manifest that many changes and modifications may be made therein without departing from the essential spirit of the invention. It is intended, therefore, in the annexed claims, to show all such changes and modifications which fall within the true scope of the invention.

What is claimed is:

1. An error corrector for use with a digital data transmission system in which the received digits have more possible values than the transmitted digits and wherein the transmitted digits are transmitted as pulse amplitudes at a baud rate which causes the transmission system pulse responses to overlap in time, which system has a decision device for receiving sampled received signals to provide a digit estimate signal proportional to the estimated value of the received digits along with a residual signal that is equal to the remainder of the sampled signal after the estimate, the sysetm also having an error detector for receiving the estimated digit signals and providing an output signal when an estimated signal achieves a level that is not one of the possible correct values, said error detector also providing signals indicative of the polarity of the error and whether the error has occurred in an even or odd baud time interval, said error corrector comprising in combination.

a. means for delaying the residual signals from said decision device by a fixed number of baud intervals;

b. an identify largest residual means for receiving and storing said residual signals for the fixed number of baud intervals; said means, upon receipt of a command signal, scanning the stored residual signals to identify the residual signal with the largest amplitude;

c. scan control means connected to receive the signals from said error detector and provide said command signal to said identify largest residual means when an error signal is received from said error detector; and d. means responsive to the identified largest residual signal and the polarity of the error signal from said error detector for adding or subtracting one level from the digit estimate corresponding to the identified residual so as to provide a corrected digit estimate.

2. An error corrector as claimed in claim 1 wherein said identify largest residual means is comprised of:

a. a store last largest residual means;

b. a comparator for comparing the most recent residual with the residual stored in said store last largest residual and for providing a gating signal when the received residual is greater than the stored residual;

c. gating means responsive to the gating signal from said comparator for feeding the received residual to be stored in said store last largest residual means; and d. means for identifying and storing the baud location corresponding to the stored residual and for providing a signal indicative of that location.

3. The error corrector according to claim 2 wherein said means responsive to the largest residual signal is comprised of:

a. means for identifying the digit associated with the largest residual stored in said store last largest residual means from the stored baud location signal and for providing a correcting signal having the polarity of said largest residual; and b. summing means for receiving the estimated digits from the decision device and said correcting signal, for subtracting said correcting signal from the associated estimated digit to provide the corrected estimated digit.

4. An error corrector for use with a digital data transmission system in which the received digits have more possible values than the transmitted digits and wherein the transmitted digits are transmitted at a baud rate which causes the signals received in response to the individual transmitted digits to overlap in time, which system has a decision device for receiving sampled received signals to provide a digit estimate signal proportional to the estimated values of the transmitted digits along with a residual signal that is equal to the remainder of the sampled signal after the estimate, the system also having an error detector for receiving the estimated digit signals and providing an output signal when a digit estimate signal achieves a level that is not any of the possible correct values, said error detector also providing signals indicative of the polarity of the error and whether the error has occurred in an even or odd baud time interval, said error corrector comprising in combination:

a. an odd baud channel and an even baud channel;

b. delay means for receiving the estimated digit decisions from said decision means and for delaying said estimated decisions a number of baud intervals;

c. first switching means, switching at the baud rate for alternately connecting said delayed estimated digit decisions to inputs of said even and said odd baud channels;

d. residual delay means for receiving the residual signals from said decision means and for delaying said residuals a number of baud intervals;

e. second switching means, switching at the baud rate for alternately connecting said delayed residual signals to inputs of said even and said odd channels f. each of said odd and even channels comprised of:

an identify largest residual means for receiving and storing said delayed residual signals for the fixed number of baud intervals; said means, upon receipt of a command signal, scanning the stored residual signals to identify the residual signal with the largest amplitude;

scan control means connected to receive the signals from said error detector and provide said command signal to said identify largest residual means when an error signal is received from said error detector;

means responsive to the identified largest residual signal and the polarity of the error signal from said error detector for adding or subtracting one level from the digit estimate corresponding to the identified residual so as to provide a corrected digit estimate; and summing means for summing the digit estimates from said odd and said even channels.

5. An error corrector as claimed in claim 4 wherein said identify largest residual means is comprised of:

a. a store last largest residual means;

b. a comparator for comparing the most recent residual with the residual stored in said store last largest residual and for providing a gating signal when the received residual is greater than the stored residual;

c. gating means responsive to the gating signal from said comparator for feeding the received residual to be stored in said store last largest residual means; and d. means for identifying and storing the baud location corresponding to the stored residual and for providing a signal indicative of that location.

6. The error corrector according to claim 5 wherein said means responsive to the identified largest residual signal is comprised of:

a. means for identifying the digit associated with the largest residual stored in said store last largest means from the stored baud location signal and for providing a correcting signal having the polarity of said largest residual; and b. summing means for receiving said delayed estimated digits and said correcting signal, for subtracting said correcting signal from the associated delayed estimated digit to provide the corrected estimated digit.

* * * * *

UNITED STATES PATENT OFFICE

CERTIFICATE OF CORRECTION

Patent No. 3,747,065 Dated July 17, 1973

Inventor(s) Earl D. Gibson

It is certified that error appears in the above-identified patent and that said Letters Patent are hereby corrected as shown below:

Column 6, line 56; change " $|d_i|$ " to -- $|\hat{d}_i|$ --

Column 7, line 54; after "4" insert -- and particularly Figure 4a --

Column 8, line 20, after "residuals" insert -- i.e., $\hat{Y}_i$'s --

Column 8, line 52, change "confirmed" to -- confined --

Column 10, line 36, after "even" insert -- means --

Column 11, line 13, change "this FF" to -- flip-flop 75 --

Claim 1:

Column 12, line 37, change "sampled" to -- samples of the --

Column 12, line 38, change "proportional" to -- equal -- line 39, change "the" to -- each --; change "digits" to -- digit -- line 40, change "remainder of" to -- difference between -- line 41, change "after" to -- and -- ; change "estimate" to -- estimated digit value --; correct the spelling of "system"

lines 43-44, after "estimated" insert -- digit -- line 44, change "achieves" to -- exceeds line 54, after "signals" insert -- delayed --

Column 12 (continued)

line 56, delete "stored" and substitute therefor -- delayed -- line 57, after "identify" insert -- and store --

Column 13, line 37, delete "sampled" and substitute therefor -- samples of the -- lines 38-39, delete "proportional" and substitute therefor -- equal -- line 39, delete "the" (second occurrence) and substitute -- each --;

" " change "digits" to -- digit -- lines 40-41, change "remainder of" to -- difference between -- line 41, delete "after" and substitute -- and --; change "estimate" to -- estimated digit value -- line 44, change "digit estimate" to -- estimated digit --; change "achieves" to -- exceeds --.

Column 14, line 9, after "channels" insert -- being -- line 10, delete "and"

Column 14 (continued)

line 11, delete "storing" ; delete "delayed"; after "signals" insert -- delayed -- line 13, delete "stored" and substitute therefor -- delayed -- line 14, insert -- and store -- after "identify".

In the Drawings:

In Figure 3, change the label on the leads connecting blocks 91 and 93 to read -- SEQUENTIAL OUTPUT OF POSSIBLE DIGIT DECISIONS $\hat{D}_i$'s --

In Figure 4a, change input to block 22 from "$d_i$" to -- $d'_i$ -- ; in block 23 change the label to read -- LIMIT TO --; change "$|d_i|$" to -- $|\hat{d}_i|$ --

In Figure 4b, change the input designation to block 32 to read -- $\hat{Y}_i$'s --; change input to block 33 to read -- $\hat{D}_i$'s --.

Signed and sealed this 19th day of February 1974.

(SEAL)
Attest:

EDWARD M.FLETCHER,JR.
Attesting Officer

C. MARSHALL DANN
Commissioner of Patents